R. Hart,
Hinge.
№ 21,925.      Patented Oct. 26, 1858.
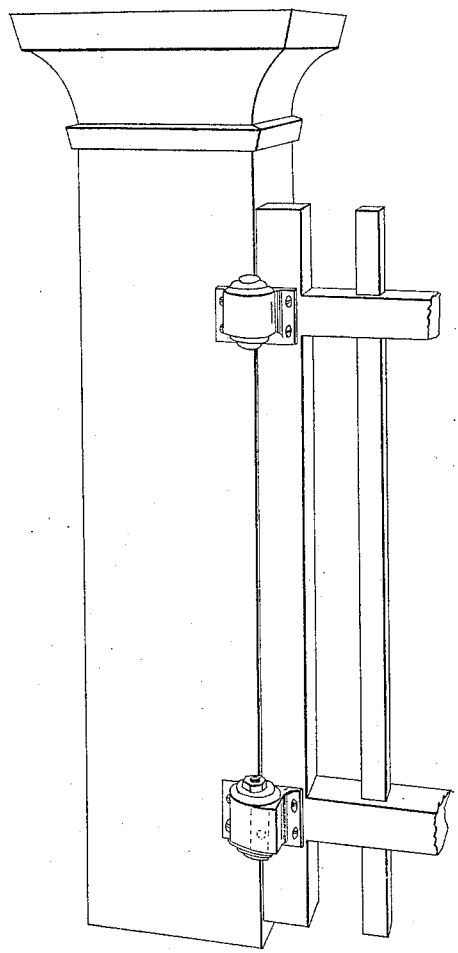
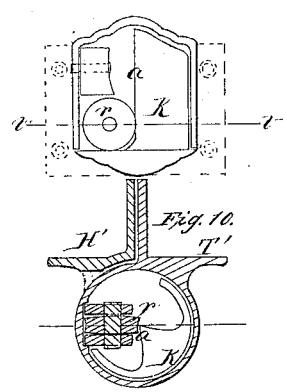
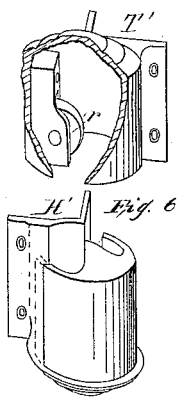
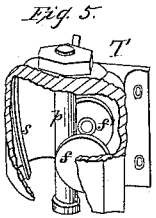
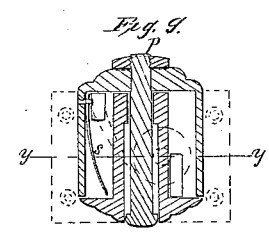
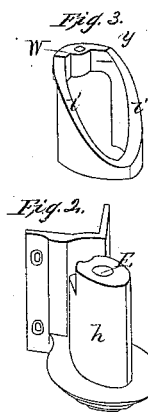
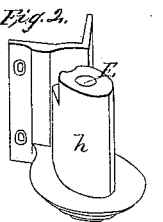
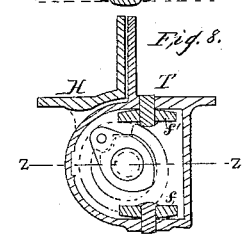

UNITED STATES PATENT OFFICE.

R. HART, OF WASHINGTON COUNTY, OHIO, ASSIGNOR TO THEODORE F. HALL, OF MARIETTA, OHIO.

HINGE.

Specification of Letters Patent No. 21,925, dated October 26, 1858.

*To all whom it may concern:*

Be it known that I, R. Hart, of the county of Washington and State of Ohio, have invented a new and useful Improved Self-Closing and Approach-Opening Hinge for Gates and Doors; and I do hereby declare that the following is a full, clear, and exact description of the construction and operation of the same, reference being had to the annexed drawings, making a part of this specification, in which—

Figure 1 is a perspective view of a gate post and part of a gate with the upper and lower hinges attached. Figs. 2, 3, 4 and 5 are perspectives of the various parts of the lower hinge. Figs. 6 and 7 are perspectives of the various parts of the upper hinge. Figs. 8 and 9 are respectively horizontal and vertical sections of the lower hinge through the respective lines $y$—$y$ $z$—$z$. Figs. 10 and 11 are respectively horizontal and vertical sections of the upper hinge through the respective lines $v$—$v$ $x$—$x$.

Similar letters of reference indicate corresponding parts in the several figures.

The hinge is constructed of iron or other suitable metal.

H and H' represent respectively the wings or portion of the lower and upper hinges to be attached to the gate post.

T and T' represent respectively the wings or portions of the lower and upper hinges to be attached to the gate.

The hook part (K) of the wing (H') is constructed with a salient angle or edge ($a$) as shown by the drawings and the wing (T') has attached to it in the position shown, the friction roller ($r$), the circumference of which is to bear against the edge ($a$) of the hook (K).

The hook part ($h$) of the wing (H) is constructed with a socket or eye (E) the same having a smaller and larger diameter as shown by the sectional drawing Fig. 9, and the wing (T) has attached to it a pivot ($p$,) to work in the socket (E). Embracing the part ($h$), and attached to it by the pivot ($u$), but allowed to have a slight alternate lateral motion thereon, is the yoke or part ($y$) constituting two inclined planes and of the form substantially as shown by the drawings.

Attached to the wing (T), in the respective positions shown by the drawings, are the friction wheels ($f$) and ($f'$) and the bent spring (S).

The operation will be readily understood. The gate being closed the friction wheel ($f$) rests upon the lower part of the inclined plane ($i$) of the yoke ($y$). Power is applied to raise the gate perpendicularly until the head of this pivot ($p$) strikes against the projection in the socket (E). The spring (S) is thus brought to bear upon the yoke ($y$) and changes the position of the same, so that the inclined plane ($i$) is brought beneath the friction wheel ($f'$). The power being withdrawn the gate of its own gravity descends and the friction wheel ($f'$) bearing upon the inclined plane ($i'$) the reaction of the plane upon the wheel causes the gate to open. Power being again applied to raise the gate the spring (S) bears against the yoke and moves it back to its former position, and the reaction of the inclined plane ($i$) upon the friction wheel ($f$) causes the gate to close.

In the construction of the hinge it is not necessary to be confined to the forms set forth in the description here given, but others substantially the same, may be adopted as convenience or fancy may suggest, and what is herein described as the lower hinge may be arranged to serve as the upper hinge, and what is herein described as the upper hinge may be arranged to serve as the lower hinge, and the combination of the two, is not essentially necessary for the effective operation of the peculiar parts of either.

What I claim as my invention and desire to secure by Letters Patent is—

1. The employment of the shifting yoke ($y$) and in combination therewith of the spring (S) constructed, arranged and operating substantially in the manner and for the purpose above set forth.

2. I claim also the combination of the hook or part (K) having a salient angle ($a$) constructed and arranged substantially as above set forth, with the inclined plane for closing and opening gates and doors.

R. HART.

Witnesses:
M. Clarke,
Stephen Newton.